No. 769,290. PATENTED SEPT. 6, 1904.
A. P. ANDERSON.
ADHESIVE WAFER AND PREPARING SAME.
APPLICATION FILED NOV. 29, 1902.
NO MODEL.
Fig.1. Fig.2.
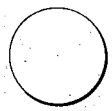
Fig.3.
Fig.4.
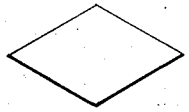
WITNESSES:
F. H. Schott
E. Szemelenyi
INVENTOR:
Alexander P. Anderson
BY George Massie
his Attorneys No. 769,290. Patented September 6, 1904.

UNITED STATES PATENT OFFICE.

ALEXANDER P. ANDERSON, OF MINNEAPOLIS, MINNESOTA.

ADHESIVE WAFER AND PREPARING SAME.

SPECIFICATION forming part of Letters Patent No. 769,290, dated September 6, 1904.

Application filed November 29, 1902. Serial No. 133,284. (No specimens.)

*To all whom it may concern:*

Be it known that I, ALEXANDER P. ANDERSON, a citizen of the United States of America, residing at Minneapolis, State of Minnesota, have invented certain new and useful Improvements in Adhesive Wafers and Preparing Same; and I do hereby declare the following to be a full, clear, and exact description of the invention, such as will enable others skilled in the art to which it appertains to make and use the same.

This invention relates to the art of treating starch materials, and has especial reference to the treatment of substantially pure starches with a view to making adhesive wafers or disks for use as articles of stationery and for other purposes.

In my Patent No. 707,892, dated August 26, 1902, I have described and claimed a method whereby starch materials are greatly expanded and converted into porous spongy readily-soluble products, and in my application, Serial No. 115,222, filed July 11, 1902, I have claimed the treatment of substantially pure starch in masses or in lumps and also the resultant product having the above-described cellular structure, the starch granules being thoroughly disrupted throughout, said product serving as an adhesive or as a sizing material. Moreover, in my concurrently-filed application, Serial No. 133,283, I have described the expansion and subsequent flattening of starch materials, including cereals and substantially pure starches and the resultant products and generically claimed the same. I do not, therefore, herein broadly claim the methods or products thus far identified; but it is the object of the present invention to produce a flattened product from substantially pure starch having the above characteristics, such flattened product for many purposes being more convenient to handle and having advantages, as will appear below.

With this object in view my invention consists in heating pure starches to a temperature above the boiling-point of water under pressure, as fully explained in my Patent No. 707,892, above referred to, and thereupon after heating action has progressed sufficiently far suddenly removing or reducing the said pressure, as also explained in my aforesaid patent, and finally flattening the expanded product so formed, preferably after the same has been exposed to the air or a moist atmosphere for some time, to enable the same to absorb hydroscopic moisture and become sufficiently pliable for the compressing action.

My invention also consists in the product formed by this process—namely, an adhesive wafer made from a substantially pure starch in which the starch granules have been disrupted substantially throughout the mass and which presents a cellular pith-like internal structure.

My invention also consists in such features, steps, and methods as will be hereinafter set forth, and pointed out in the claims.

In preparing my new product I preferably heat a substantially pure starch of any description in a substantially air-dry condition under gas-pressure—such, for example, as air-pressure—to a point above the boiling-point of the liquid contained in the starch granules of the starch at normal atmospheric pressure or, what is practically the same thing, above the boiling-point of water at normal atmospheric pressure, for a period of time not long enough to permit the escape of too much of the liquid contained in the starch granules of the starch through the granule coatings by diffusion. I thereupon while substantially maintaining the said temperature release or remove the pressure from the starch with such rapidity that the liquid will suddenly burst or flash into gaseous form or steam, which will result in an instantaneous expansion or explosion of the entire mass of the material into several times its original volume. This expansion is such that the lumps of the material preserve their original shape and become very much enlarged and porous copies of the original lumps, provided the heat applied be sufficient to render the granule material sufficiently coherent after the explosion. What I consider the best temperature for this purpose is given below, and it is probable that such temperature softens the starch cellulose sufficiently to become adhesive or sticky.

It should be observed that it is within the scope of my invention not only to quickly remove the entire pressure upon the starch while heated to a certain temperature under such pressure, but also to merely reduce the said pressure to a point sufficiently below the point at which the liquid contained in the granules will boil at such temperature to cause the same to suddenly burst into a gaseous condition. The term "reduce the pressure," as employed in the claims, is broad enough and is intended to cover a complete removal, as well as a partial reduction, of the pressure. The important point under all conditions is to heat the starch under pressure and thereafter while the same is thus heated to suddenly reduce said pressure sufficiently below the point at which the liquid boils at the temperature imparted to cause the same to suddenly gasify. When these products are first made according to the above, they are crisp and dry, since at the time of their expansion a portion of the moisture contained in them in their air-dry condition is given off as steam, which escapes into the atmosphere, leaving the material from three to six per cent. lighter after the process than before. The remaining water or moisture normally contained in the air-dry masses or lumps assists in the swelling or expansion of the same; but as soon as the swelling has taken place, or, in other words, at the instant the expansion of the moisture into steam has occurred as a result of the reduction or removal of the pressure, there is also an instantaneous condensation. This condensed moisture remains in the expanded product and forms, with the starch, a dry glazing. The glazing on the surface is very characteristic of all of the products made under the above process, including all substantially pure starches and pure starch preparations, such as pearl sago or pearl tapioca. When any one of the substantially pure starch products resulting from this treatment is kept exposed to the air for some time, it regains its weight by absorbing hydroscopic moisture from the air. It also loses to a certain extent its crispness and becomes more flexible and pliable, but still remains dry and retains its characteristic surface glaze. Under the preferred form of carrying out my invention I utilize this property and flatten or compress the lumps or pellets of starch after they have remained in the air for some time after the expansion under my process. This flattening can be done, for example, by running the material through a wringer; but on a large scale it is run through wooden rollers. Steel rollers may also be employed for this purpose, provided they are so adjusted that no crushing of the product takes place. This flattening does not destroy the characteristic glaze nor the peculiar cellular structure of the product above referred to.

For the purpose of a complete disclosure of my invention I will now describe more in detail the manner of carrying out my invention in its preferred form. I place starch—such, for example, as commercial laundry-starch—broken up into small pieces or grains, or what is known as "pearl sago," into sealed glass tubes or iron vessels—such as described in my aforesaid patent, No. 707,892—which are hermetically sealed, as above, and place the same in an oven the temperature of which is raised from 130° to 200° centigrade during a period of time varying from twenty-five to thirty minutes, or longer when the vessels being heated are large or thick-walled. After removing the tubes from the oven I break them open or open them as quickly as possible before cooling and then allow the expanded contents to remain exposed to the atmosphere for a sufficient length of time to enable them to absorb sufficient hydroscopic moisture to render them pliable, (adding from six to seven per cent. to their weight,) care being taken that the individual expanded lumps or pieces of starch remain separated and do not adhere. The lumps or pieces are then flattened by passing them between rollers, such as the rollers of a wringer, or between wood or steel rollers, care being taken that they are merely flattened, but not crushed.

The resultant wafers or disks will be found a very convenient form of paper-fasteners, since they can be used for causing sheets of paper to stick together by simply moistening and then pressing them between the sheets and compressing the sheets upon the interposed wafers. It has been found by experiment that the adhesive qualities of such wafers are equal if not superior to any adhesive substance or device employed for this purpose. These wafers will keep for any length of time and are always ready for use, avoiding much of the inconvenience experienced with the use of the ordinary mucilage or paste receivers hitherto employed for this purpose. As to the internal structure of these adhesive wafers, it should be stated that the starch granules throughout the same have been disrupted and destroyed, while the exterior of the wafers is covered with a glazed glutinous coating, which serves to preserve them indefinitely.

The adhesive wafers may be in the form of disks, which may be of any shape or contour and may be regular or irregular in outline and which may be of any suitable thickness for the purpose required. They need not necessarily be made of an expanded piece or lump just large enough to make one wafer, but can be made by cutting out pieces or small blocks from large masses of starch expanded, as described, which pieces are then flattened, or the expanded masses of starch material may be flattened and the disks or wafers cut out from the flattened sheet by suitable dies or in any other suitable manner. Where pearl sago is used, for example, each grain will when expanded and flattened under my invention serve as a very effective adhesive wafer.

In the accompanying drawings are shown several of the many forms in which the adhesive wafers hereinbefore described may be employed.

In the drawings, Figure 1 represents such a wafer having a circular contour; Fig. 2, one rectangular in outline; Fig. 3, one irregular in outline; and Fig. 4, one lozenge or diamond shaped.

It is to be understood that the contour of such wafers is immaterial and may be varied according to desire or purpose, and the forms shown are simply given as examples of the flattened adhesive disks or wafers embodying my invention.

For the purpose of carrying out the process of expanding the starch material and breaking up the starch granules hereinabove described any suitable apparatus—such as described in my hereinbefore-mentioned patent, No. 707,892 or in Patent No. 21,077 to A. S. Lyman—may be employed.

It should be noted that while the above constitutes the preferred manner in which I carry out my invention the details of the process of expanding the starch materials may be varied in many ways, as explained in the said patent, without departing from my invention. I may also produce fair results by flattening the material before the same has been exposed to the air for any appreciable length of time; but the best results are obtained by exposure to the air of the expanded product for one or several days before flattening.

Having thus fully described my invention, what I claim as new, and desire to secure by Letters Patent, is as follows:

1. The process of preparing starch materials, which consists in heating substantially air-dry substantially pure starch under pressure to a temperature above the boiling-point of water, and suddenly removing the pressure, and, finally, flattening the resultant product.

2. The process which consists in submitting substantially pure starch of a spongy, cellular form, having the starch granules thereof disrupted, to pressure, for the purpose of flattening the same.

3. The process which consists in heating substantially air-dry substantially pure starch under pressure to a temperature above the boiling-point of water, then suddenly removing the pressure, then exposing the expanded product to the atmosphere, and, finally, flattening the same.

4. As a new article of manufacture, a flattened piece of substantially pure starch wherein the starch granules are disrupted substantially throughout the mass.

5. As a new article of manufacture, a glazed, flattened piece of substantially pure starch wherein the starch granules are disrupted substantially throughout the mass.

6. As a new article of manufacture, an adhesive wafer consisting of a compressed or flattened piece of substantially pure starch, the starch granules of which are disrupted throughout the body of the same.

In testimony whereof I affix my signature in presence of two witnesses.

ALEXANDER P. ANDERSON.

Witnesses:
A. NELUND,
JOHN LIND.